United States Patent

[11] 3,590,616

| [72] | Inventor | Ludwig Schussler<br>Willich, Germany |
|---|---|---|
| [21] | Appl. No. | 754,281 |
| [22] | Filed | Aug. 21, 1968 |
| [45] | Patented | July 6, 1971 |
| [73] | Assignee | Schloemann Aktiengesellschaft<br>Dusseldorf, Germany |
| [32] | Priority | Aug. 25, 1967 |
| [33] | | Germany |
| [31] | | Sch 41209 |

[54] MEANS FOR CONTROLLING THE MOVEMENTS OF A MANIPULATOR
5 Claims, 1 Drawing Fig.

[52] U.S. Cl. ................................................. 72/21,
72/421, 72/425
[51] Int. Cl. ............................................... B21d 37/08,
B21d 43/02
[50] Field of Search ........................................... 72/420,
421, 425, 422, 21; 214/1 B, 26

[56] References Cited
UNITED STATES PATENTS

| 3,274,819 | 9/1966 | Knowles | 72/421 |
| 3,468,154 | 9/1969 | Hertl | 72/421 |
| 3,447,349 | 6/1969 | Lippke | 72/421 |
| 3,349,601 | 10/1967 | Burrows | 72/421 |

Primary Examiner—Charles W. Lanham
Assistant Examiner—Robert M. Rogers
Attorney—Holman & Stern ABSTRACT: Means for controlling the movements of a forging manipulator, comprising: a a tongs-holder or peel assembly and tongs so mounted on a manipulator carriage as to be axially movable and rotatable thereon, a hydromotor for driving the carriage, a piston-and-cylinder unit for driving the tongs-holder and tongs relatively to the manipulator carriage, valves controlling the supply of pressure fluid to the hydromotor and to the piston-and-cylinder unit, so arranged that during the forging stage of the working cycle the tongs-holder and tongs are moved relatively to the manipulator carriage at the same speed as the manipulator carriage but in the opposite direction, whereas when the workpiece is free to move, the piston-and-cylinder unit is automatically connected with a source of fluid pressure at a higher pressure and is moved in the same direction as the manipulator carriage but at a higher speed.

PATENTED JUL-6 1971 3,590,616
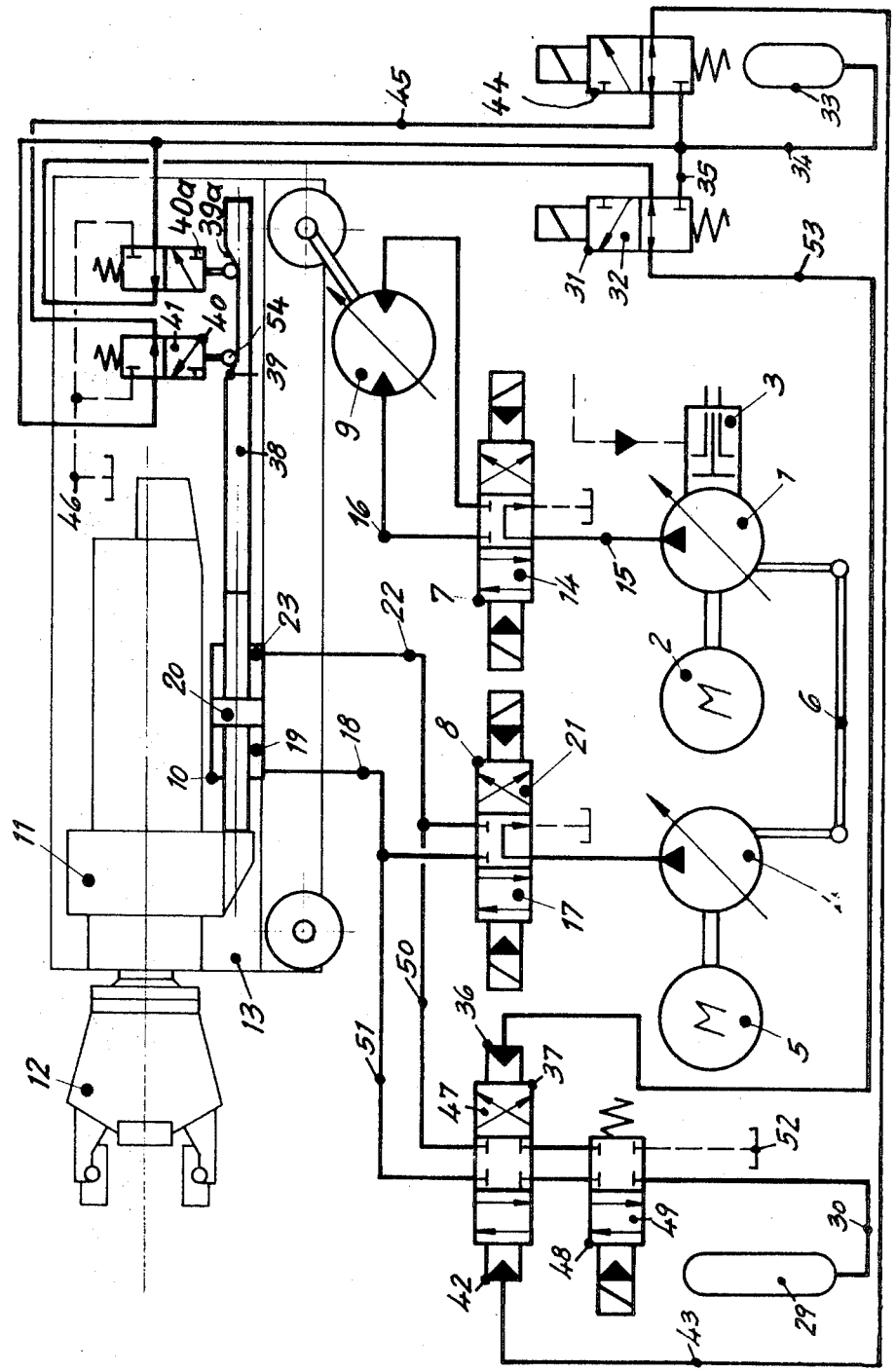

MEANS FOR CONTROLLING THE MOVEMENTS OF A MANIPULATOR

This invention relates to an additional control for controlling the movements of a manipulator during the working cycle in forging, wherein the manipulator consists of a manipulator carriage running on one or more driving wheels, with tongs and tongs-holder (or peel assembly) axially and rotationally movable upon this carriage, and wherein the movement of the driving wheel or wheels is effected by means of a hydromotor, and the axial movement of the tongs, with tongs-holder, is effected by means of a piston and cylinder actuated by a pressure fluid, the axial movement of the tongs, with tongs-holder being dependent upon the travelling movement of the carriage, in such a way that with a continuous travelling movement of varying magnitude, in the forging operation of the working cycle, the axial tongs movement, for the purpose of maintaining a point stationary in space, is so controlled as to be equal in magnitude and opposite in direction whereas, for the advance of the forging, it is equally great and the same in direction as the travelling movement of the carriage.

Therefore, upon a manipulator carriage which is travelling with a continuous speed of varying magnitude towards and away from a forging press, with a tongs-holder, so arranged upon it as to be axially movable, are controlled in such a way that for the interval of the forging operation the tongs will move with a speed equal to that of the carriage but in the opposite direction, so that they remain stationary in space. For the second part of the working cycle, namely the forward movement of the forging, with the tongs, the tongs are now controlled with a speed again equal in magnitude but this time in the same direction as the speed of the carriage.

In consequence of the high frequency of the forging strokes per unit of time, however, this speed of advance of the tongs travelling forward upon the moving manipulator carriage is not sufficient. There was therefore the requirement, at the moment of lifting, of a forging press electrically coupled with the manipulator, so that the tongs, with the tongs-holder, attained great and controlled advances over the travelling manipulator carriage per unit of time, these advances always being uniform in magnitude. The power output or efficiency of the hydropump driving the piston of the tongs by means of oil under pressure is too small for the relatively high piston speeds and advances of the tongs required suddenly at the high stroke frequencies and small stroke lifts of a forging press. On the ground of the extremely short intervals of time, savings of time must therefore be effected in switching and control times, as well as in the buildup and fall of hydraulic pressure.

According to the invention this is attained by the fact that for the accelerated drive of the tongs, with tongs-holder, movable axially with and upon the carriage, and in the same direction, with the pressure medium in the control system hitherto in operation switched off, a further pressure fluid of higher intensity can be automatically switched on to the piston of the tongs-holder and controlled. In this case the pressure fluid of higher intensity is preferably supplied as pressure oil from a disconnectable pressure-reservoir.

In a further development of the invention, reversing valves arranged on the manipulator are controllable by means of a sliding camlike curve on the tongs-holder piston rod, lengthened at one end, wherein, by means of reversing valves, the connection between the pressure reservoir and the cylinder spaces of the tongs-holder piston is controllable by way of a valve.

One embodiment of the invention will now be described with reference to the accompanying drawing.

This drawing shows diagrammatically in side elevation a manipulator carriage running on wheels, with axially movable tongs, with tongs-holder, arranged thereon, and with the motors, pumps, valves, reservoirs and pipes symbolically indicated in the diagram.

For the comprehension of the supplementary control according to the invention, the buildup and operation of the control is first given, by which both the manipulator carriage and the tongs-holder so arranged thereon as to be axially movable, are moved by means of oil pressure produced by hydropumps.

A pump 1, for instance an axial-piston pump, is driven by a motor 2, and, by means of a servocontrol 3, is varied continuously that is, steplessly from zero to maximum delivery. A pump 4, driven by a motor 5, is connected by way of a linkage or system of levers 6 with the pump 1, and consequently ranges, likewise continuously, from zero to maximum delivery. By way of a four-thirds way valve 7 the pressure oil passes from the pump 1 to a hydromotor 9, which moves a manipulator carriage 13 to and fro in a continuously variable manner. The pressure oil from the pump 4 passes, by way of a four-thirds way valve 8, to a cylinder 10, and, by way of a piston 20 slidable therein, moves a tongs-holder or peel assembly 11, with tongs 12, likewise to and fro. The cylinder 10 is fixedly connected with the manipulator carriage 13.

Since, upon reciprocation of the manipulator carriage 13, with tongs-holder 11, from time to time, only the four-thirds way valves 7 and 8 are controlled, only the advance of the manipulator carriage 13, with simultaneous retraction of the tongs-holder 11, will be described hereunder.

The pump 1 is adjusted by means of the servocontrol 3, an electrical impulse being at the same time imparted to the way valve 7, and the position 14 of this valve thereby being brought into operation. The pressure oil passes from the pump 1, by way of a pipe 15, the valve 7 and a pipe 16, to the hydromotor 9, which sets the manipulator carriage 13 in motion in a forward direction. With the adjusting of the pump 1, there is also effected at the same time the delivery of an electrical impulse to the valve 8, whereupon the position 17 of the valve 8 comes into operation. The pressure oil of the pump 4 passes through the valve 8 and through a pipe 18 into a cylinder space 19 of the cylinder 10, and displaces the piston 20 back towards the right, with the tongs-holder 11 and the tongs 12 secured thereto. The absorption volumes of the cylinder space 19 and the hydromotor 9 are so adjusted to the delivery flows of the pumps 1 and 4 that the speed of advance of the carriage is exactly as great as the speed of retraction of the tongs. The tongs 12 are therefore stationary in space.

The speed of advance of the carriage and the speed of retraction of the tongs are continuously variable by means of the servocontrol 3 and the adjusting rodding 6. For the advance of the tongs-holder 11, with the tongs 12, upon the advancing manipulator carriage 13, the valve 8 is changed over to the position 21. The pressure oil of the pump 4 is hereby passed, by way of a pipe 22, into a cylinder space 23 of the cylinder 10, and pushes back the piston 20 towards the left, into its initial position, with a speed equal to that of the carriage 13, the tongs-holder 11 with the tongs 12 being moved upon the manipulator carriage 13 in the direction of travel thereof. The tongs 12 consequently move forward in space with twice the carriage speed.

The supplementary control according to the invention now becomes operative by way of pipes 50 and 51, which are connected to the pipes 22 and 18 already described. Since forward and rearward movements of the manipulator carriage 13, with the tongs-holder 11, are the same in operation, only the forward movement of the manipulator carriage 13 will be described. This is begun at the moment at which, as already described above, upon the advance of the manipulator carriage 13, the tongs-holder 11, with the tongs 12, travels back upon the latter, that is to say, when pressure oil flows from the pump 4 by way of the valve 8 in the position 17 and through the pipe 18 to the cylinder space 19. At this moment a valve 31 receives an electrical impulse, and the position 32 of the valve 31 comes into operation. The functioning of a reversing valve 40a is thereby switched off, and the controlling oil from a pressure reservoir 33 now passes independently of the reversing valve 40a directly, by way of pipes 34 and 35 and the valve 31, into a pipe 53 leading to a piston 36 controlling a valve 37. Since the control piston 42 of the valve 37 is also subject to the same pressure, the valve 37 is held in its midposition.

The piston 20, with a lengthened piston rod 38 having a camlike curve 39, remains stationary in space, while the manipulator carriage 13, with the valves 40 and 40a secured to it, moves forward. A roller 54 of the valve 40 now runs up the curve 39 of the lengthened piston rod 38. By this means the position 41 of the valve 40 comes into operation. Consequently the controlling piston 42 of the valve 37, hitherto subject to pressure, is switched, by way of a pipe 43, a valve 44, a pipe 45 and the valve 40, to an oil discharge 46. The piston 36 controlling the valve 37 therefore pushes the valve position 47 into the middle of the valve 37, and this valve is now ready for work.

In so far as the forging press, not shown, after the forging operation, now changes over to reverse, an electrical impulse goes to the valves 8 and 48. The valve 8 goes to its midposition, and switches the hydropump 4 to reverse or diversion, and thus interrupts the movement of the piston 20 relative to the manipulator carriage 13.

In the valve 48 the position 49 is now pushed to the middle. The way is thereby set free for the pressure oil from a pressure reservoir 29, the pressure in which is higher than the pressure in the reservoir 33, to flow by way of a pipe 30, the valve 37, (in the position 47), and the pipes 50 and 22, into the cylinder space 23 of the cylinder 10. At the same time the cylinder space 19 of the cylinder 10 is connected, by way of the pipes 18 and 51, and the valves 37 and 48, with an oil outlet 52.

The pressure oil from the pressure reservoir 29, in an extremely short time, pushes the piston 20 forward (towards the left in the drawing) in the direction of travel of the manipulator carriage 13, so far that the roller 54 of the valve 40 has quitted the curve 39. The position 41 of the valve 40 is thereby brought out of operation, and the basic position of the valve is established. The controlling oil from the pressure reservoir 33 now passes again by way of the pipe 34, the valve 40, the pipe 45, the valve 44 and the pipe 43 to the control piston 42, which pushes the valve 37 into its midposition. The pressure oil from the pressure reservoir 29 is stopped. At the same time the valve 48 moves to its midposition. A fresh advance of the tongs may thus begin.

The magnitude of the absolute advance of the tongs is therefore composed of the path of the manipulator carriage 13 and the path of the tongs displacement upon the manipulator carriage 13. The advance of the tongs thus admits of being regulated continuously in dependence upon the speed of the manipulator carriage.

I claim:

1. Means for controlling the movement of a forging manipulator electrically coupled to and cooperating with a forging press, comprising: a manipulator carriage travelling upon wheels, a peel assembly, with jaws, movable axially upon the manipulator carriage, a hydraulic motor for driving the wheels of the manipulator carriage, a double-acting hydraulic piston-and-cylinder unit for impelling the peel assembly to and fro relatively to the manipulator, the movements of the manipulator, and of the peel assembly relatively to the manipulator, being equal in magnitude but opposite in direction during a forging operation, so that the peel assembly then remains stationary, a first hydraulic pump for actuating the hydraulic motor, a second hydraulic pump for actuating the piston-and-cylinder unit, during the forging operation, and a first pressure reservoir connected in parallel with the said second pump for actuating the piston-and-cylinder unit for advancing the peel assembly, characterized by the feature that the said controlling means also comprises piping connecting the said first pressure reservoir with the piston-and-cylinder unit, a way valve interposed in the said piping for preadjusting and switching off the flow of pressure liquid from the pressure reservoir, a control bar mounted on the peel assembly, means cooperating with the said control bar for bringing the said way valve into its operative position when the manipulator carriage and the peel assembly are moving in opposite directions and for bringing it into an inoperative position when the peel assembly and the manipulator carriage are moving in the same direction.

2. Controlling means as claimed in claim 1, further comprising: combined mechanical and hydraulic means for bringing the said way valve into its operative position and into its inoperative position.

3. Controlling means as claimed in claim 1, the control bar being secured to the piston rod of the piston-and-cylinder unit, and the controlling means further comprising: reversing valves mounted on the manipulator carriage, rollers cooperating with the control bar to control the said reversing valves, a second pressure reservoir communicating with the piping that connects the first pressure reservoir with the piston-and-cylinder unit.

4. Controlling means as claimed in claim 3, the control bar being formed with two plane surfaces one behind the other, and a curved surface connecting these two plane surfaces with one another.

5. Controlling means as claimed in claim 3, further comprising: pipes connecting the said reversing valves with the way valve and controlling the latter, and bypass valves interposed one in each of these pipes.